Nov. 2, 1937.  F. C. LIEBHARDT  2,097,628
COUPLING
Filed Aug. 2, 1935
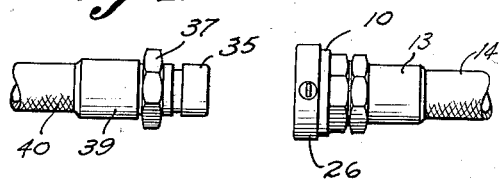
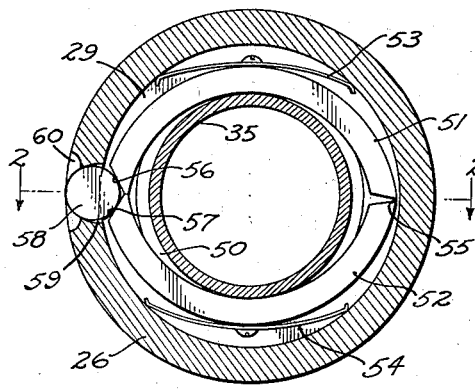
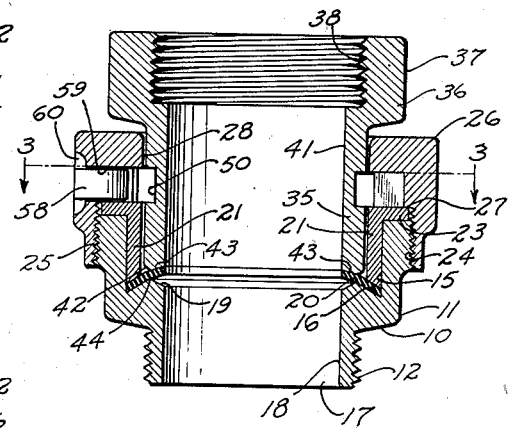
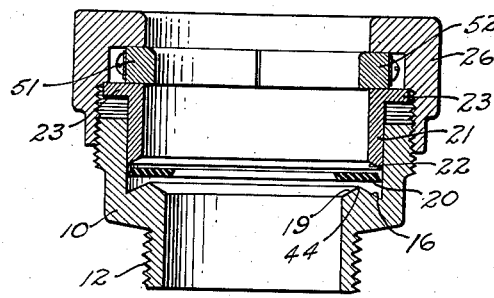
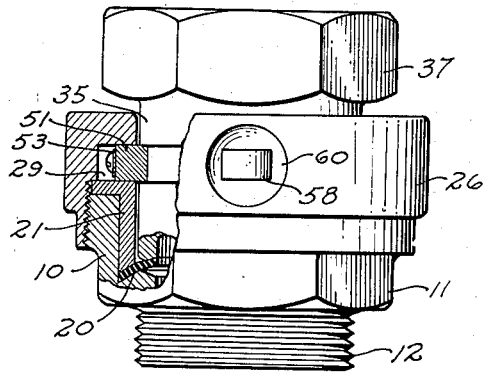
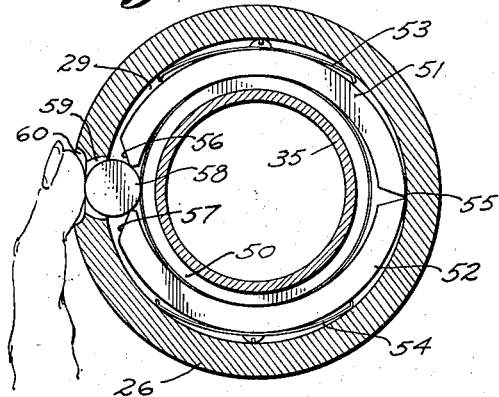
INVENTOR.
Frederick C. Liebhardt,
BY
Russell M. Otis
ATTORNEY.

Patented Nov. 2, 1937

2,097,628

UNITED STATES PATENT OFFICE 2,097,628

COUPLING

Frederick Charles Liebhardt, San Marino, Calif.

Application August 2, 1935, Serial No. 34,416

8 Claims. (Cl. 285—173)

My invention relates to improvements in couplings, particularly those employed in coupling together two sections of hose or a section of hose to an outlet from a tank or the like, and constitutes an improvement upon the coupling disclosed in my copending application, Serial No. 734,012, filed July 6, 1934, now Patent No. 2,023,428 of Dec. 10, 1935.

An object of my invention is to provide a coupling in which the two halves can be easily and quickly united by simply pushing one half into the other, and which cannot be separated by pressure or pulling but only by a deliberate operation of a convenient releasing means.

Another object is to make a coupling which permits complete swiveling of one half within the other when united.

Another object is to make a coupling which is free from leakage regardless of the fluid pressure within, and in which the seal against leakage is tighter with increased pressure.

Another object of the invention is to make a coupling in which the sealing surface on the male member is so positioned that it is not easily damaged and may be easily cleaned.

Another object is to provide a coupling employing a sealing packing which may conveniently be made from a flat sheet of material.

A further object is to provide a coupling employing an unlocking or releasing means which does not protrude from the outside of the coupling, which cannot be damaged by external impact, and which is adapted to contact the internal parts of the coupling on ever different surfaces so that uniform wear is assured.

Another object of my invention is to provide a coupling in which the two halves are permitted a limited relative movement throughout which the coupling is sealed against leakage.

Still another object is to provide a coupling which is dependable, of long life, and which is cheap to manufacture.

These objects I attain in a manner which will be clear from consideration of the following description taken in connection with the drawing, of which:

Fig. 1 is a view showing the two halves of the coupling separated, each joined to a section of hose, and in position for uniting.

Fig. 2 is a sectional view of the united coupling taken along the line 2—2 of Fig. 3.

Fig. 3 is a sectional view of the united coupling taken along the line 3—3 of Fig. 2, showing the locking mechanism in the locked position.

Fig. 4 is a sectional view similar to Fig. 3 except that the locking device is shown held in the unlocked or releasing position.

Fig. 5 is a view, partly in diametric section, of the united coupling as viewed from the side through which the releasing cam protrudes.

Fig. 6 is a sectional view of the female member of the coupling from the same point of view as in Fig. 5, showing one stage in the assembly of the female member.

In my coupling I provide a female member having a tubular body 10 with a hexagonal exterior 11 and with threads 12 at one end to receive a threaded female member which may be part of a tank or pipe or the like or may, like member 13 be attached to one section 14 of a hose to be coupled. The body 10 is recessed at 15, the recess ending in a shoulder 16 which slopes in the direction of the male member as it approaches the axial fluid passage 17 through the coupling. Near the interior wall 18 of the body 10, in the region 19, the shoulder 16 is reversed in slope so that it slopes away from the male member of the coupling as the shoulder approaches the wall 18. The recess 15 and shoulder 16 are adapted to accommodate a resilient packing washer 20 preferably made of duprene, or other synthetic rubber, or of rubber, or other flexible or resilient material. Clamping the washer 20 against the shoulder 16 is the annular flanged ring 21 which is provided with an end 22 which is angled to the same slope as the shoulder 16. The ring 21 is of about the same outside diameter as the recess 15, there being sliding clearance between. The top of the ring 21 terminates in a flange 23 which, when the female member is assembled, is forced down on the top of the body 10. The top of flange 23 is engaged by a shoulder 27 of the cap 26. Cap 26 is threaded at the lower end 25 and is adapted to screw over the upper threaded portion 24 of body 10. The ring 21 is so proportioned that when cap 26 is screwed down tightly against flange 23 to bring the flange down against the body 10, the washer 20 is tightly squeezed between the ring and shoulder 16. The washer 20, thus clamped, is supported over the outer portion overlying shoulder 16 but is unsupported in the region overlying portion 19. The cap 26 has a hole in the top of about the same diameter as the inside diameter of the ring 21, permitting the male member to pass therethrough, the cap 26 being thick enough to cause the inner surface 28 to act as a guide for the insertion of the male member. Between the flange 23 and the upper part of cap 26 lies an annular recess 29 in which is carried part of the locking and unlocking mechanism to be described later.

The male member 35 is a tubular nipple having cylindrical internal and external surfaces, and having an enlarged portion 36 with a hexagonally formed exterior 37 and threaded inside at 38 to receive a male member 39 attached to a section 40 of the hose to be coupled. The male member 35 is adapted to be inserted through the hole in cap 26 and into the body 10 and be stopped by the washer 20 which will be wedged between the member 35 and the shoulder 16. The inside surface 41 of the male member 35 is preferably of the same diameter as the inside surface 18 of body 10 and is adapted to form with this surface and with the edge of washer 20, when the coupling is united, a continuous smooth passage from one end of the coupling to the other except for the small annular groove existing between washer 20 and portion 19 of the adjacent shoulder. This relatively smooth interior fluid passage is a feature of great importance in applications such as the coupling of fire hose where high fluid velocity exists and where no pressure loss due to frictional obstruction can be tolerated.

The entering end of the male member 35 is rounded at its outer corner 42 so that burring of this corner will not affect introduction of the member into the female half of the coupling. The seal between the two halves of the coupling is obtained through contact between the inner unsupported portion of the upper face of washer 20 and the internal surface 43 near the end of member 35. The sealing surface 43 is formed to slope inwardly from the lowermost point of the male member at an angle of about 75° to the axis of the coupling which is found to be equal to the angle of the inner portion of the washer when the washer is pushed downwardly by the male member a sufficient amount to assure proper sealing. Thus when the male member is inserted into the female member, it first contacts on the innermost edge of surface 43 the washer 20 which is protruding in the path of the male member at substantially the angle of the shoulder 16. At this stage the entire washer is of substantially conical shape, and the contact with the male member 35 is on the outside of the cone. As the male member is inserted further, the inner unsupported portion of the washer is bent downward around the fulcrum edge 44 causing that portion of the washer to take a greater angle with respect to the axis and to contact more of the surface 43. At some point in the travel of the male member the washer will come to the same angle as the surface 43 when the washer will contact the surface all the way across. This relative position is the operative relation of the two halves of the coupling. The locking mechanism is designed to hold the male member from retracting from substantially the operative position relative to the female member.

The locking mechanism is, however, sufficiently loose to permit the male member to be inserted farther than when in the operative position. When the male member is inserted farther than the operative position it first continues to bend the washer downward and finally compresses the washer 20 between the foremost end portion of the male member and the opposite fulcrum edge 44 of shoulder 16. It is important to easy operation in locking and unlocking and to cheap manufacture that the male member be permitted to move a small amount in either direction from the operative position, and my construction permits this while at the same time assuring a perfect seal throughout this limited range of travel of the male member.

It will be noted that in the operative position of the male member within the female member, the washer is pressing against the surface 43 with a force which arises from the resilience of the washer 20—from its tendency to take the angle of the shoulder 16. This force is sufficient to prevent leakage of difficult fluids such as gasoline under low pressures. The amount of this force is dependent upon the radial location of the fulcrum edge 44 which is preferably positioned radially outward beyond the lowermost edge of the male member. Positioning the fulcrum farther outward radially reduces the resilient force of the washer against the sealing surface of the male member. The resilient force is also dependent, of course, upon the thickness of the washer 20 in relation to the dimensions of the adjacent parts.

The pressure of the washer against the sealing surface may be increased by use of a spring metal washer adjacent and underlying or embedded in the material of washer 20. In fact, it is possible to cover a washer of resilient metal with a layer of leather or similar material to secure a satisfactory result, and and when I employ the term resilient washer I mean any washer, including these forms, that is capable of resilient deflection in the direction of travel of the male member.

When a high pressure exists in the coupling, the washer is pressed with a force proportional to the high pressure against the surface 43 because the fluid pressure acts on the under side of washer 20 in the annular groove between the washer 20 and the portion 19 of shoulder 16. An important feature of my sealing means is that the sealing surface 43 of the male member is part of the internal surface of the member, rather than of the external surface which is so often burred and scratched by rough handling in practice.

In the external surface of the male member 35 is formed an annular groove 50 into which substantially radially movable arcuate elements circumferentially disposed in the annular recess 29 of the female member spring when member 35 is inserted in operative position within the female member, and prevent member 35 from being withdrawn unless the arcuate elements are deliberately spread apart. The arcuate elements in the form of ring sections 51 and 52 which cooperate with groove 50 are preferably of a radius of curvature somewhat greater than that of the male member 35 and are of such length that when contracted together, as in Fig. 3, the middle portions can fall deeply into the groove 50. The upper and inner edges of the ring sections are beveled to facilitate introduction of the male member into the aperture formed by them. The ring sections have attached to them on their outside surfaces flat springs 53 and 54 which encircle about half the ring sections. The ends of these springs, which are bent inwardly, bear on the inside wall of cap 26 and tend to push together, or contract, the ring sections radially inward. In assembling, the ring sections are held by friction, due to spring pressure, within cap 26, but when the cap 26 is in place on body 10, the ring sections are confined in the annular recess 29 formed by the cap 26 and the top of flange 23. When the cap 26 is screwed tightly against flange 23 the height of this recess is sufficient to permit free radial movement of the arcuate elements within it. The ring sections 51 and 52 preferably, but not necessarily, contact one another at 55 in the locked position and are cut away at an angle from the point of contact so that dirt or other matter adhering to the opposed faces of the ring sections will not prevent them from closing. The other ends of the ring sections 51 and 52 are formed with sloping cam surfaces 56 and 57, respectively, on the outer portions of the ring sections, while the adjacent inner portions of the opposing ends of the ring sections form radial abutments which meet when the ring sections are contracted. The cam surfaces 56 and 57 are adapted to be engaged by a radially movable cam 58 in the shape of a short cylinder with its axis substantially parallel to that of the coupling itself and which lies in a recess 59 in the wall of cap 26. When the ring sections are contracted, the cam 58 is forced by pressure of springs 53 and 54, acting through surfaces 56 and 57, against the outer wall of recess 59. Another recess 60 is formed in the external surface of cap 26 and joins the recess 59 so as to allow the cylindrical cam 58 to protrude through the opening into the recess 60 where it can be engaged by a finger of the operator external to the coupling as shown in Fig. 4. The recess 60 is of such size and shape to permit the finger of the operator to follow the cam to its innermost position. The cam, the wall of cap 26, and the recess 59 are preferably so dimensioned that the cam 58 does not extend beyond the periphery of the cap 26, and the cam is thus protected against impact in service.

In Fig. 3, the coupling is shown united and locked by contraction of the ring sections 51 and 52 into the groove 50 of the male member. To unlock the coupling, the cam is adapted to act, by entering between the cam surfaces 56 and 57, to spread apart these contiguous ends of the ring sections and lift the ring sections out of the groove 50 to permit withdrawal of the male member. In this action the ring sections rock about their point of common contact 55. Fig. 4 shows the coupling after the cam 58 has been depressed by the finger of the operator to unlock the coupling.

The cam surfaces 56 and 57 are preferably flat surfaces having an angle of 45° to 60° with the radius, but this angle may be varied to effect a greater or less movement of the ring sections for a given movement of the cam, a greater angle with respect to the radius resulting in more movement of the ring sections. A very valuable feature of the invention is the cylindrical shape of the cam 58. This shape makes the cam wear uniformly, which is an important factor in long life. Another advantage is that the cylindrical cam is self-cleaning in that it almost always is rotated slightly in the plane of the ring sections 51 and 52 as it is depressed and the friction of the contact with the cam surfaces of the ring sections keeps both cam and cam surfaces clean. Another advantage of the cylindrical shape is that if any object strikes the exposed portion of the cam with a tangential blow, it does not bend or otherwise damage the cam but simply rotates it.

Fig. 6 shows the female member of the coupling being assembled. This figure is intended particularly to portray the character of the preferred form of my sealing washer 20. This washer may be molded in the conical shape in which it is shown in Fig. 2, but it is preferably formed as a flat washer as shown in Fig. 6 and brought into the conical shape by distortion caused by clamping the ring 21 down tightly against it to cause it to seat on the shoulder 16. The flat washer of resilient material such as duprene, rubber, or the like, may be made by punching it out of a sheet of the material or by molding the material as is well-known in the rubber art. Preferably, but not necessarily, the inner and outer edges of the washer are made to slope upward and toward the axis of the coupling as shown in Fig. 6 in order that when finally in position the edges of the washer may be as shown in Fig. 2. In assembling the female member, the washer 20 is placed within the body 10 and down against the shoulder 16 as shown in Fig. 6. The ring 21 is inserted, and the cap 26 with its contained locking means is screwed onto body 10. As the ring 21 is forced downward, it in turn forces the flat washer 20 down into the angular groove below until the ring finally compresses the washer 20 against the shoulder 16. In this operation the flat washer is distorted into a conical shape which has a comparatively great stiffness because of its distortion. In addition to this advantage, the construction employed makes possible a great saving in that washers can be punched out of sheet stock and the costly process and equipment involved in molding a conical washer are avoided.

The manner of operation of my coupling is as follows: Assume that the coupling is disconnected. The ring sections 51 and 52 are by reason of spring pressure, held together at both ends, forming an oval shaped aperture. To unite the two halves of the coupling, the male member 35 is simply pushed into this aperture, spreading the rings and keeping them spread until the groove 50 comes opposite the ring sections when they contract, by reason of spring pressure, into this groove, locking the coupling together. Ordinarily this operation is performed so rapidly, and the permissible movement of the ring sections is enough, that the member 35 comes to a stop against the washer 20 which is supported by the shoulder 16, making it unnecessary for the ring sections to take the shock of this impact. The two halves of the coupling are now united and they can only be disconnected by deliberately spreading the ring sections to a larger inside diameter than the external diameter of the male member. While united, the members of the coupling may be completely swiveled with respect to one another, because there is nothing but friction of the seal to prevent relative rotation. Fluid under high or low pressure within the coupling is sealed against leakage by the pressing of washer 20 against surface 43, and the greater the pressure, the tighter is the seal. When it is desired to disconnect the coupling, the cam 58 is depressed by the finger of the operator, spreading the ring sections apart until their inside diameter is greater than the diameter of the external surface of the male member, when the two halves of the coupling can be separated easily and without effort.

I have shown only one cam acting to spread the ring sections apart, but it is possible to employ two cams, one at each junction of the ring sections which may be operated simultaneously to spread apart the ring sections. In such a construction, there are naturally cam surfaces on both ends of each ring section, and the rings are not rocked apart, but each cam acts as does the single cam in the embodiment illustrated. Furthermore, the ring sections need not be two in number. There may be any convenient number of ring sections of any convenient length operated by a sufficient number of cams entering between the corresponding contiguous ends of the ring sections to spread them out of engagement with the groove of the male member.

While my conical washer is preferably arranged as previously disclosed, my method of formation of a conical washer is also adapted to a conical washer sloping in the opposite direction from that illustrated. To accomplish this, the shoulder 16 and the end of the clamping ring are reversed in slope causing the washer to slope away from the entering male member as the washer approaches the axis of the coupling. In this case, however, the washer bears on an outside sealing surface of the male member and the advantages of an internal sealing surface on the male member are lost.

It is understood that these and many other modifications in design and construction may be made by those skilled in the art without departing from the spirit and scope of the invention, and I wish, therefore, to be limited only by the appended claims.

What I claim is:

1. In a coupling including a male member and a female member adapted to form when united a fluid passage through said coupling, locking and unlocking means comprising an annular groove in said male member, a pair of arcuate elements circumferentially disposed within said female member and adapted to contract into said groove when said male member is inserted in operative position within said female member, and a cylindrical cam rotatable about an axis substantially parallel to the axis of said coupling and adapted to cooperate with a pair of contiguous ends of said elements to spread apart said contiguous ends and expand said elements out of said groove to permit withdrawal of said male member.

2. In a coupling including a male member and a female member adapted to form when united a fluid passage through said coupling, locking and unlocking means comprising an annular groove in said male member, a pair of movable arcuate elements circumferentially disposed within said female member, resilient means adapted to contract said elements into said groove when said male member is inserted in operative position within said female member, cam surfaces on a pair of contiguous ends of said elements, and a substantially radially movable cylindrical cam operable from without said coupling and rotatable about an axis substantially parallel to the axis of said coupling and adapted to cooperate with said cam surfaces to spread apart said contiguous ends of said elements and expand said elements out of said groove to permit withdrawal of said male member.

3. In a coupling including a male member and a female member adapted to form when united a fluid passage through said coupling, sealing means comprising a resilient washer peripherally fixed in said female member and having an inner unsupported portion adapted to bear on an internally bevelled seat on said male member.

4. In a coupling including a male member and a female member adapted to form when united a fluid passage through said coupling, sealing means in said female member comprising a conically shaped resilient washer having an unsupported portion adapted to bear on an internally bevelled seat on said male member when said male member is in operative position within the female member, and means adapted to lock said male member in operative position within said female member.

5. A coupling comprising a male member and a female member adapted when united to form a fluid passage through said coupling, a conically shaped resilient sealing washer adapted to bear on an internally bevelled seat on said male member when said male member is inserted in operative position within said female member, an annular groove in said male member, a pair of arcuate elements circumferentially disposed within said female member and adapted to contract into said groove when said male member is inserted in operative position within said female member, and a cam rotatable about an axis parallel to the axis of said coupling and adapted to cooperate with a pair of contiguous ends of said elements to spread apart said contiguous ends and expand said elements out of said groove to permit withdrawal of said male member.

6. In a coupling, a female member having a conical shoulder, a normally flat resilient washer placed in the female member, means for clamping said washer against said shoulder whereby said washer is distorted into conical shape to present an unsupported portion which contacts the male member of said coupling when in operative position within said female member.

7. A coupling comprising a male member and a female member adapted when united to form a fluid passage through said coupling, said female member having a conical shoulder, a normally flat resilient washer placed in the female member, means for clamping said washer against said shoulder whereby said washer is distorted into conical shape to present an unsupported portion which contacts the male member of said coupling when in operative position within said female member, and means adapted to lock said male member in operative position within said female member.

8. A coupling comprising a male member and a female member adapted when united to form a fluid passage through said coupling, said female member having a resilient sealing washer including an unsupported portion adapted to bear on an internally bevelled seat on said male member when said male member is in operative position within said female member, an annular groove in said male member, a pair of arcuate elements circumferentially disposed within said female member and adapted to contract into said groove when said male member is inserted in operative position within said female member, and a cam adapted to cooperate with a pair of contiguous ends of said arcuate elements to spread apart said contiguous ends and expand said elements out of said groove to permit withdrawal of said male member.

FREDERICK CHARLES LIEBHARDT.